US008306878B2

(12) United States Patent
Nagarajan

(10) Patent No.: US 8,306,878 B2
(45) Date of Patent: Nov. 6, 2012

(54) SYSTEM AND METHOD FOR DETERMINING COLOR USAGE LIMITS WITH TIERED BILLING AND AUTOMATICALLY OUTPUTTING DOCUMENTS ACCORDING TO SAME

(75) Inventor: Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/941,002

(22) Filed: Nov. 5, 2010

(65) Prior Publication Data

US 2012/0116935 A1 May 10, 2012

(51) Int. Cl.
*A01K 5/02* (2006.01)

(52) U.S. Cl. ............................ 705/29; 235/382; 705/34

(58) Field of Classification Search .................... 705/29, 705/34, 400; 358/1.15, 1.19
See application file for complete search history.

(56) References Cited

U.S. PATENT DOCUMENTS

| | | | | |
|---|---|---|---|---|
| 4,065,031 | A | 12/1977 | Wiggins et al. | |
| 5,204,699 | A | 4/1993 | Birnbaum et al. | |
| 5,867,198 | A | 2/1999 | Gwaltney et al. | |
| 6,844,937 | B2 | 1/2005 | Dempsey et al. | |
| 6,972,857 | B2 | 12/2005 | Mantell et al. | |
| 2005/0206982 | A1 | 9/2005 | Hattori | |
| 2005/0226503 | A1 | 10/2005 | Bailey et al. | |
| 2006/0101523 | A1 | 5/2006 | Talbert | |
| 2007/0182984 | A1 * | 8/2007 | Ragnet et al. | 705/400 |
| 2007/0187493 | A1 * | 8/2007 | Hong et al. | 235/382 |
| 2008/0130026 | A1 * | 6/2008 | Mizuno | 358/1.9 |
| 2009/0099980 | A1 | 4/2009 | Ni et al. | |
| 2009/0185202 | A1 * | 7/2009 | Morales et al. | 358/1.9 |
| 2009/0195799 | A1 | 8/2009 | Malik et al. | |
| 2009/0195800 | A1 | 8/2009 | Malik et al. | |
| 2009/0195801 | A1 | 8/2009 | Malik et al. | |
| 2009/0265286 | A1 * | 10/2009 | Nagarajan | 705/400 |
| 2010/0005038 | A1 | 1/2010 | Nagarajan et al. | |
| 2010/0088201 | A1 | 4/2010 | Nagarajan et al. | |
| 2010/0280929 | A1 | 11/2010 | Coffey et al. | |

FOREIGN PATENT DOCUMENTS

JP 2006202063 A * 8/2006

OTHER PUBLICATIONS

Ashlee Vance, New Inks Cut Costs of Office Color Printing, www.newyorktimes.com, May 6, 2009.
Xerox Corporation, Xerox ColorQube 9200 series Three Tiered Billing.
Rafael Diaz et al., Hybrid Color Plan White Paper Phaser 8860/8860MFP, Xerox Corporation, May 2008.

* cited by examiner

*Primary Examiner* — Ramsey Refai
*Assistant Examiner* — Hunter Wilder
(74) *Attorney, Agent, or Firm* — Pillsbury Winthrop Shaw Pittman, LLP

(57) ABSTRACT

Disclosed is a method and a system for automatically outputting documents based on at least a user's credentials. A highest billing tier for processing the image data from a plurality of billing tiers and which is based on credentials for the specified user is selected, and the image data is processed and output. Alternatively, if the highest billing tier selected is not authorized by a user's credentials, then a next highest billing tier is selected in accordance with the credentials, and the job is automatically processed and then output. The credentials may be based on an available amount of credit in a user's account (e.g., to print at billing cost) or a user's authorization (e.g., to print color documents), for example. The tiers may be based on one or more thresholds, such as a percentage of color content in a document.

15 Claims, 4 Drawing Sheets

SYSTEM AND METHOD FOR DETERMINING COLOR USAGE LIMITS WITH TIERED BILLING AND AUTOMATICALLY OUTPUTTING DOCUMENTS ACCORDING TO SAME

BACKGROUND

1. Field

The present disclosure is generally related to billing for and outputting documents. More specifically, the present disclosure is related to automatically outputting documents at the highest billable tier allowed based on a customer's credentials.

2. Description of Related Art

One barrier to the adoption of color document output within offices is the inability to conveniently control and/or limit color usage by users (e.g., for cost purposes). In some instances, in order to provide options with regard to printing documents in color, users are being provided with multiple color billing options. An example of such an option is the introduction of pricing and output options based on a tiered billing concept, such as disclosed in U.S. patent application Ser. No. 12/580,686 entitled "System and Method for Determining a Billing Structure for Documents Based on Color Coverage of Marked Color Pixels," filed Oct. 16, 2009, hereby incorporated by reference in its entirety.

Even with such billing and pricing options, some enterprise and cost conscious customers would like to restrict usage of color output and printing within their environments. In some systems or products, feature access control is provided whereby certain features (such as use of color) are enabled (or disabled) based on user's credential(s). For example, only specific users may be authorized for (or limited from) color printing. However, such limitations generally only work with 2-tier billing models, i.e., a user is merely limited to printing in black & white or color. Therefore billing models with three or more tiers that offer several levels of color impressions (e.g., black and white, everyday color, expressive color) are underutilized.

Also, some methods attempt control color usage to users or customers by utilizing a monochrome-only print driver. However, downloading and installing a print driver that supports color can circumvent this (i.e., the customer can easily bypass color restrictions by loading a different driver that supports color). Therefore, some systems have the controller provide color access control. However, in many instances, controller decisions may delete a user's print job if his/her job doesn't meet the required credential(s). For example, after a user's job is submitted, the user's credentials may be analyzed for authorization of color usage. If the user is authorized to use color, the job would be printed. If not, the job would be deleted.

Other attempts to control printing include analyzing the sensitivity of data to be processed by a device, such as described in U.S. Patent Application Publication 2006/0101523 to Talbert entitled "Automatic Custom Interface Based Upon the Security Level of a Document, published May 11, 2006 and assigned to Xerox Corporation, as well as offering a user pricing options per page (or per document), such as described in U.S. Patent Application Publication 2010/0005038 to Nagarajan et al. entitled "System and Method for Personalized Price per Print/Copy," published Jan. 7, 2010 and assigned to Xerox Corporation, both of which are also incorporated by reference in their entirety. However, such systems typically require user input and/or decisions with regard to output.

Accordingly, an improved system and a method for determining a user's color usage limits (or credentials) with a tiered billing process and automatically outputting documents according to a user's credentials is desirable.

SUMMARY

One aspect of the disclosure provides a method for automatically outputting documents comprising at least one page for a specified user using an image processing apparatus. The image processing apparatus has a processor for processing documents containing image data having a plurality of pixels and an image output terminal for outputting documents. The processor is configured to perform the method including:

receiving image data of a document comprising at least one page;

selecting a highest billing tier for processing the image data from a plurality of billing tiers and based on credentials for the specified user, each billing tier being based on at least one predetermined threshold;

processing the image data according to the at least one predetermined threshold of the selected highest billing tier, and outputting the image data of the document using the image output terminal.

If processing and output at the selected highest billing tier is unauthorized or insufficient based on the credentials, then the method further includes:

selecting a next highest billing tier from the plurality of billing tiers for processing the image data that is sufficient and based on the credit of the credentials;

processing the image data according to the at least one predetermined threshold of the selected next highest billing tier, and outputting the image data of the document using the image output terminal.

In another aspect of the disclosure, a system for automatically outputting documents comprising at least one page for a specified user is provided. The system includes: a processor for processing documents containing image data having a plurality of pixels; and an image output terminal for outputting documents. The processor is configured to:

receive image data of a document comprising at least one page;

select a highest billing tier for processing the image data from a plurality of billing tiers and based on credentials for the specified user, each billing tier being based on at least one predetermined threshold;

process the image data according to the at least one predetermined threshold of the selected highest billing tier, and output the image data of the document using the image output terminal.

If processing and output at the selected highest billing tier is unauthorized or insufficient based on the credentials, then the processor is further configured to:

select a next highest billing tier from the plurality of billing tiers for processing the image data that is sufficient and based on the credit of the credentials;

process the image data according to the at least one predetermined threshold of the selected next highest billing tier, and output the image data of the document using the image output terminal.

Other features and advantages of the present disclosure will become apparent from the following detailed description, the accompanying drawings, and the appended claims.

DETAILED DESCRIPTION

Figure 1:
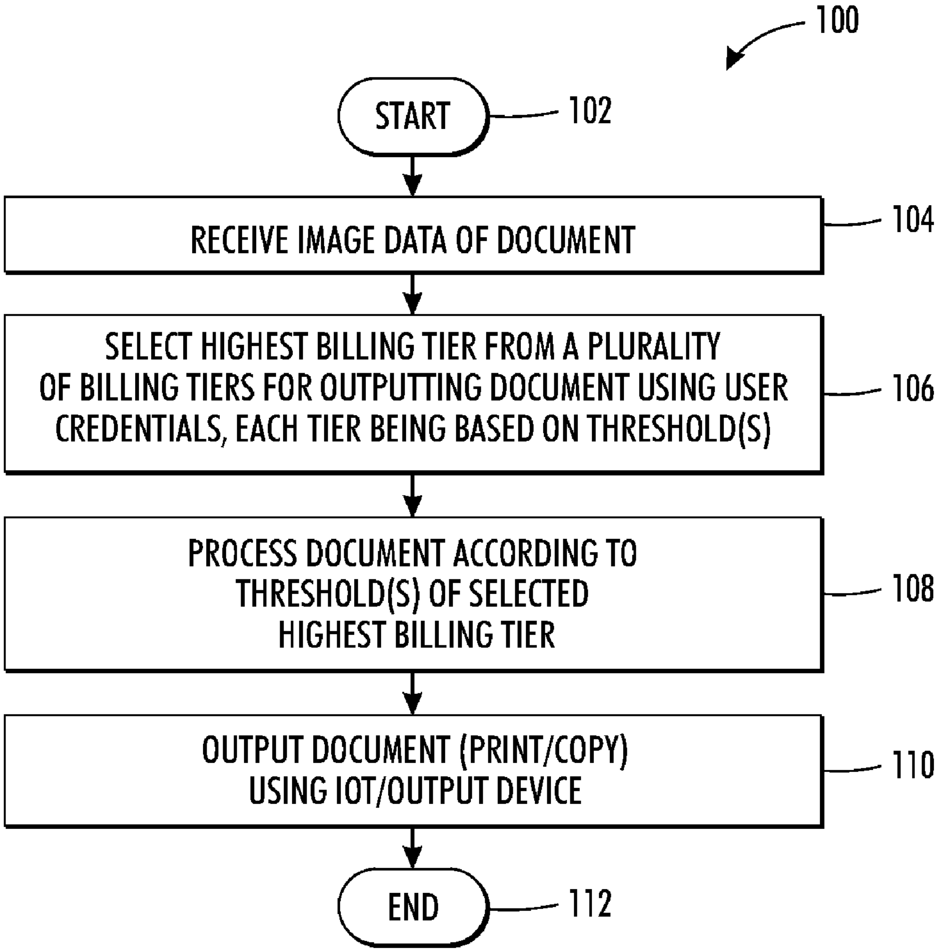
FIG. 1 illustrates an exemplary flow chart/block diagram illustrating a method for automatically outputting documents comprising at least one page for a specified user using an image processing apparatus or system in accordance with an embodiment.

In order to further increase color printing in the marketplace, this disclosure proposes a way to automatically enforce color usage limits based on user credentials. A user's job that is submitted will be automatically processed and output (copied/printed) to the maximum billing tier possible for his/her credentials. In this case, "automatically" processed and output refers to processing image data without user interaction or input, based on received credentials. For example, when documents are submitted to be copied or printed using an output device, the image data is processed such that the document is output at its highest possible quality (e.g., using the most color possible) for that specific user. For example, as is further described below, if a user is authorized to make Tier-1 and Tier-2 copies/prints using an image processing apparatus, and he/she submits a job that is marked for Tier-3 output, then the document(s) in the job will be automatically processed and printed at the Tier-2 level. This provides an improved alternative to known systems which may typically require user input and/or which may delete a job altogether.

Generally, in output systems/devices (e.g., printers, copiers, or multi-function devices or printers (MFDs), such as the system shown and described with reference to FIG. 4), when a document is to be output (copied or printed), it is input to a device and the image data is processed in an image path. In the image path when the image data is processed, it is determined if the input image data comprises black and white (or gray) pixels of image data, i.e., no significant color image data in one or more color planes, or color pixels. Then, in these systems/devices, the image is determined to be a black and white or color image (or a combination thereof) for output.

The method(s) or device(s) used to determine the type of image for output in this disclosure should not be limiting.

In order to categorize types of images and any costs associated with such images, a billing structure may be determined and/or selected based on the type of image. A billing structure is a method by which a charge for printing a document is calculated. The billing structure may include a plurality of factors, which are not disclosed in detail herein (see the incorporated '686 Application for some examples). In an embodiment, the billing structure is based on a multi-tiered threshold value. The multi-tiered threshold value may be determined using a number of factors (e.g., a color coverage ratio, percentage of color to a page/document, percentage of colorant (ink/toner) for marking, percentage of color pixels, etc.). Based on such factors, the page or document may be billed by choosing a billing structure associated with a tier (e.g., Tier-1, Tier-2, Tier-3) based on a number of satisfied threshold(s). That is, one or more predetermined thresholds may be used to separate billing tiers which may be used to charge a customer. Such multi-tier bill plans provide options to the customer which better match types of printed (or copied) documents and workflows. The at least one predetermined threshold for each billing tier may be selected from one or more of the following group: a percentage amount of color in the document (which can include: a percentage amount of color for output, a percentage amount of color for marking, and/or a percentage of color pixels), an amount of colorant used to output the document, and a saturation level of color, for example.

Although throughout this disclosure it is noted that each billing tier comprises at least one predetermined threshold, billing tiers may be selected based on one or more thresholds, counts (e.g., pixel counts) values, or algorithms, for example. In an embodiment, the at least one predetermined threshold associated with each billing tier is defined by one or more percentage amounts of color (e.g., count of color pixels to total count of pixels to be marked) in a document. For example, a range of percentages may be used for each tier. Exemplary embodiments using percentage amounts of color as a threshold are described in more detail with reference to FIGS. 2 and 3.

In an embodiment, tiers may be divided into a 3-tier threshold billing structure such as disclosed in the incorporated U.S. patent application Ser. No. 12/580,686, i.e., expressive, useful, and everyday color use. For example, the three tiers may be defined as follows: Tier-1: all black and white documents and documents with a small amount of color are billed at black and white rate; Tier-2: documents with more than a small amount of color but less than a large amount of color are billed at a lower than market color impressions rate (everyday color, level 2 impressions); and Tier-3: documents with large amounts of color are bill at a competitive market color impressions rate (expressive color, level 3 impressions). To determine or separate such tiers, break-points or thresholds may be used. In an embodiment in accordance with this disclosure, the thresholds dividing the tiers may be percentages such as approximately 3% and approximately 10%. That is, if a page is determined to have an amount of color coverage that is below or equal to approximately 3%, tier-1 is used for billing. If greater than approximately 3% but less than or equal to approximately 10%, tier-2 is used for billing. Otherwise, i.e., if the amount of color coverage is greater than approximately 10%, the page is billed using tier-3. In an embodiment, the percentage thresholds may be approximately 1.5% and approximately 8%. In another possible embodiment, the thresholds may each be a determined pixel count of the marked color pixel locations to be output. That is, the thresholds may correspond to a set number of color pixels or pixel locations (e.g., approximately 250,000 and 1.8 million color pixels) that are determined to be on the page to be output. Thus, the page is determined and compared to see if it has a count that is less than, more than, or a count between the designated number or count of marked color pixel locations in the device dependent space. Thus, the pixel count of the color pixel locations is defined as the amount of color coverage. In an embodiment, the thresholds and/or the billing tier may be selected as disclosed in the incorporated '686 Application.

However, the threshold value(s) and the methods of defining the threshold value(s) that are used to determine the tiers (e.g., ratio, percentage, pixel count) should not be limiting.

Additionally, any number of billing tiers (i.e., N-tiers) may be used. For example, four (4) or more billing tiers may be used. In an embodiment, the number of billing tiers may also or alternatively be defined by a type of output device selected for output. For example, if a user selects a machine capable of outputting multiple colors (including black) or capable of high graphic output, more billing tiers (and/or thresholds) may be provided. Alternatively, if a user selects a machine capable of outputting only one or two colors (including black), less billing tiers (and/or thresholds) may be provided. In some embodiments, depending on the output device or system (e.g., MFD) used, the color level impressions may be defined differently. For example, in a possible practical embodiment, Level 2 impressions for these devices may include a combination of the above-defined Level 2 Impressions+Level 3 Impressions. As such, the selection and breakpoints/thresholds for defining such tiers and billing structures should not be limited to the examples provided herein. Correspondingly, billing costs associated with billing tiers may also be adjusted. Various other multi-tiered billing strategies or thresholds are also envisioned.

Throughout this disclosure, for explanatory purposes only, it is to be understood that a progressive indication of billing tiers—e.g., tier-1, tier-2, tier-3—indicates a progressive amount of color in a document, i.e., billing/output costs at tier-2 are higher than those at tier-1, billing/output costs at tier-3 are higher than those at tier-2 and tier1, etc. Also, it is to be understood that an amount of color in a document (that is used to determine the billing tiers, for example) as used throughout this disclosure is not limited just to an amount of color that is visible to the human eye when the document is output. For example, the amount of color may also refer to an amount of colorant (ink or toner) used for marking and output, for example. Also, it is to be understood that an amount may refer to a percentage, ratio, and the like.

The method and the system disclosed herein may identify areas of a document that could be printed/copied with alternative image quality/formatting options (e.g., less color usage or coverage) and automatically process the document with the alternative options in order to adjust (e.g., downgrade) the billing tier according to the user's credentials (e.g., from Tier-3 to Tier 2). Thus, the document can be processed and output without forcing the user to input or set multiple imaging parameters.

FIG. 1 illustrates an exemplary flow chart/block diagram illustrating a method 100 for automatically outputting documents comprising at least one page for a specified user using an image processing apparatus or system, in accordance with an embodiment. As shown in FIG. 4, the system or image processing apparatus comprises at least one processor for processing documents containing image data comprising a plurality of pixels and an image output terminal for outputting documents. A controller may also work in cooperation with processor(s). At least the one processor is configured to perform the method 100 of FIG. 1. Specifically, the method 100 begins or starts at block 102.

At block 104 image data of a document comprising at least one page is received (e.g., by the processor(s)). The processor (s) then process the image data of the document for output. In accordance with an embodiment, processing the image data for output comprises determining a percentage amount of color in the document, for example. At block 106, a highest billing tier from a plurality of billing tiers is selected for outputting the document. The selected highest billing tier is based on a the processing image data and based on credentials for the specified user. For example, as noted above, each billing tier is based on at least one predetermined threshold. The threshold may be based on an amount of color pixels in a document. In an embodiment, the amount of color in the document as well as the credentials (e.g., authorization) may be used to select the highest billing tier for the document.

Then, at block 108, the image data of the document is processed according to the at least one predetermined threshold of the selected highest billing tier, and output using the image output terminal, as shown at block 110. For example, if the selected highest billing tier has a color threshold, e.g., between 1.5 and 5 percent, then the image data may be processed based on at least such percentage, and then automatically output (printed). The method ends at block 112.

As previously noted, the credentials may be used to determine one or more billing tiers at which a document may be output for a specific user. Accordingly, they can also determine how image data is processed (e.g., see blocks 106 and 108 of FIG. 1).

In an embodiment, credentials for a specified user may be received before the image data of the document is received as shown at block 104 in FIG. 1. For example, a user may input the credentials directly (e.g., via an interface that retrieves data from a directory or storage) or indirectly (e.g., via a network) to a system and/or image processing apparatus, and the credentials are received for the at least one output job. That is, credentials may be associated with a specific output (print) job, or associated with a number of output jobs (e.g., until a user logs out or signs out).

Alternatively, in another embodiment, the credentials may be read from a document (e.g., a scanned document). For example, a header of a document may include user credentials, profile, or similar identification information for retrieval. In any embodiment, once credentials are received, the apparatus or system can perform a lookup and determine if the user exists and/or what the user's credentials are (e.g., able to print color, able to cover costs).

Throughout this disclosure, "credentials" are defined as an authorization, authentication, or a right to printing privileges. In particular, credentials define a user's right to color printing privileges. Credentials may include a predetermined set of conditions for processing and outputting image data. Credentials are used to determine the one or more billing tiers at which a user can output documents. For example, in an embodiment, the credentials of a user comprises appropriate color usage limits (e.g., authorization (based on seniority) to print at one or more predetermined billing tiers), and may define the authorization to print at a billing level or tier. In another embodiment, for example, credentials may be defined be an amount of credit available in a user's account. The credentials of each user may be customized and adjusted in any number of ways.

For example, in an embodiment, one predetermined threshold for each billing tier (e.g., Tier-1, Tier-2, Tier-3) is an amount of color in the document (or page), and the credentials of the profile show that a user may print at level one and level two color impressions (i.e., documents determined to be of a Tier-1 or a Tier-2 billing structure). If the user inputs a document that has level three color impressions, i.e., the processor may determine and select the highest billing tier for the document as Tier-3. However, since the credentials limit output to Tier-1 and Tier-2, a next highest billing tier will be selected (i.e., a Tier-2 billing tier (outputting at level two color impressions)), and then the image data will be processed and output. Thus, in this exemplary embodiment, processing the image data may also comprise altering the output document such that the amount of color coverage is less when output. Such alteration of the image data/output document may include processing the image data with the processor(s) such that an amount of output color pixels is limited, an amount of colorant (ink/toner) used for marking and outputting the document is limited, etc. For example, for a document or a page with different types of image data such as color text logos, monochrome objects, and colored picture areas, it may be determined according to a user's profile credentials that only the logos could be printed in true color, while the rest of the document (i.e., monochrome objects and colored picture areas) is output (e.g., printed) in less saturated color or in black and white (or grayscale).

The processing and/or alteration of image data at the next highest billing tier should not be limited to a percentage amount of color. For example, in an embodiment, processing the image data of the selected next highest billing tier may comprise, either in addition to or alternative to less color coverage, one or more of the following steps: adjusting hues of colors of the image data, adjusting sharpness of pixels of the image data, adjusting contrast between pixels of the image data, adjusting saturation levels, and/or selectively processing pixels based on a type of image data for output. It should be understood by one of ordinary skill in the art that additional processing steps may be applied to pixels of image data of a document to be output to meet restrictions and/or constraints of the credentials and/or tiers.

Figure 2:
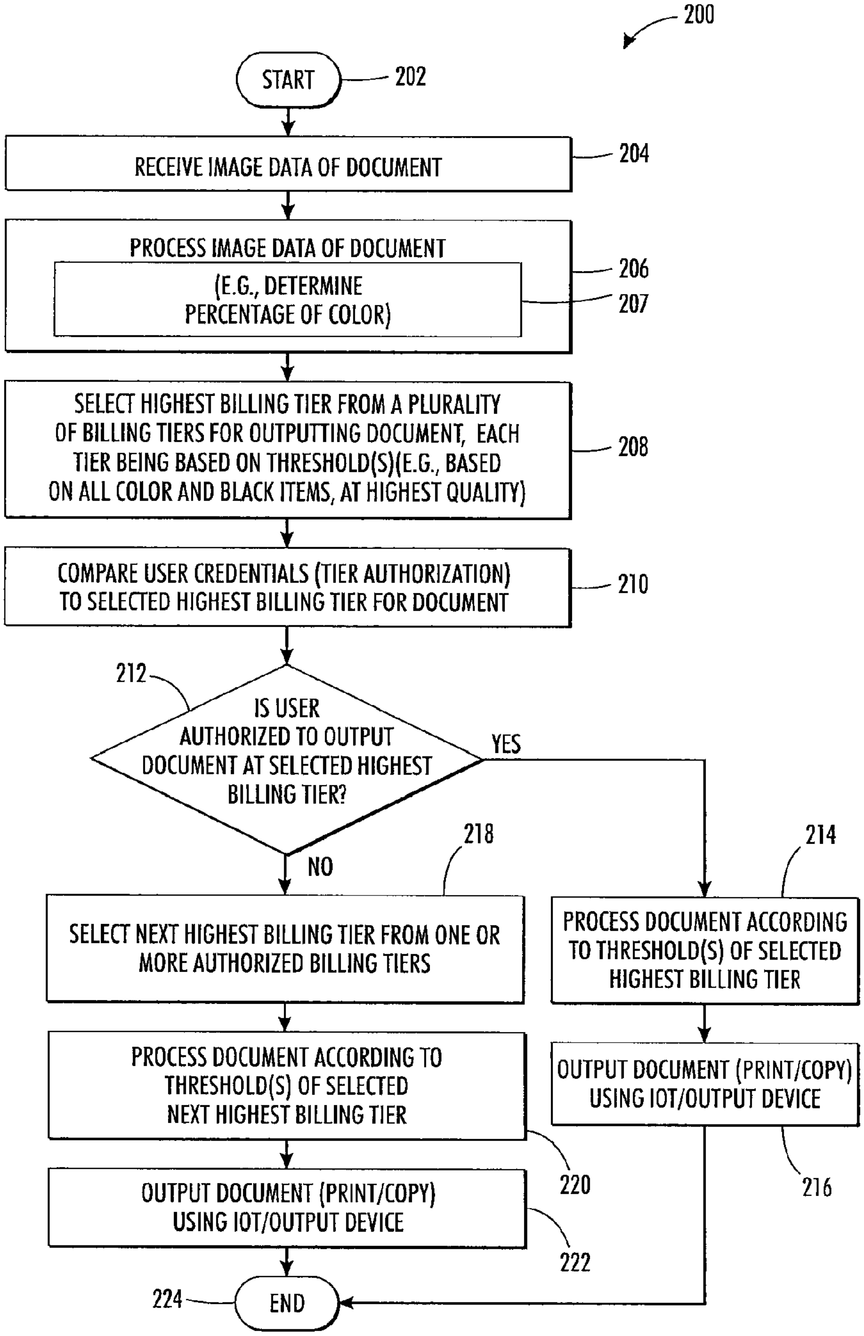
FIG. 2 illustrates an exemplary flow chart/block diagram of a method for automatically outputting documents wherein a user's credentials comprise authorization to output documents at one or more billing tiers from a plurality of billing tiers, in accordance with an embodiment.

FIG. 2 illustrates an exemplary flow chart/block diagram illustrating a method 200 for automatically outputting documents using an image processing apparatus or system, in accordance with the above-described embodiment, i.e., the user's credentials comprise authorization for outputting documents at one or more predetermined billing tiers. For example, authorization(s) or restriction(s) on color printing may be based on seniority in the workplace or workflow. Additionally or alternatively, authorization (or restriction) may be based on a time of day that a device is being used for output or based on a type of device selected for output. The method(s) or feature(s) used to determine authorization should not be limiting.

Also, for explanatory purposes only in this exemplary embodiment, the at least one predetermined threshold for each billing tier is based on a range of percentage amounts of color in the document. For example, as previously described, in this embodiment each billing tier may be selected based on a percentage of color (e.g., color that is output, ink/toner that is used for output, etc.). In an embodiment, for example, the percentages for the tiers may comprise ~0 to ~1.5% (Tier-1), ~1.5 to ~8% (Tier-2), and ~8% or greater (Tier-3).

Like method 100, method 200 of FIG. 2 begins or starts at block 202, and at block 204 image data of a document is received by the processor (or system or apparatus). Although not shown, credentials for a user may also be received, such as via input (before or after image data is received) and/or reading data associated with the document. Then, at block 206, the image data of the document is processed for output. In this embodiment, processing the image data for output may comprise, among other things, determining a percentage amount of color in the document, as indicated at block 207. The highest billing tier then is initially (or originally) selected from a plurality of billing tiers based on the processed image data at block 208. For example, in an embodiment, the highest billing tier may be a billing tier at which the image data is output with its highest percentage amount of color, at its highest quality (e.g., all colors and color spaces (including black/grayscale), and/or rendering techniques, are used to process the pixels of image data and then the billing tier is selected based on such processing). At block 210 a user's credentials, i.e., authorization for outputting at specific billing tiers, is compared to the initially selected highest billing tier. That is, the comparison determines if the authorization at the one or more predetermined billing tiers in the user's credentials allows for output of the processed image data at the initially selected highest billing tier. If the user is authorized to output documents at the initially selected highest billing tier in block 212, i.e., YES, then the image data is processed at block 214 according to at least the one predetermined threshold of the selected highest billing tier and then the document is output at block 216. The method 200 ends at block 224.

If, however, the user is not authorized to output document at the initially selected highest billing tier (based on the comparison of the user's credentials) at block 212, i.e., NO, then a next highest billing tier is selected based on the one or more authorized billing tiers indicated by the user's credentials at block 218. In an embodiment, the selection of the next highest billing tier at block 218 comprises processing the image data of the document for output using a billing tier with a lesser range of percentage amounts of color than the range of percentage amounts of color in the highest billing tier for processing the image data. For example, the highest billing tier may comprise a first range of percentage amounts of color—e.g., ~8%—and the next highest billing tier may comprise a second range of percentage amounts of color—e.g., ~1.5% to ~8%. After the next highest billing tier is selected, the image data is automatically processed (without user intervention, and processing and/or marking of the image data being adjusted, as necessary) according to the at least one predetermined threshold of the selected next highest billing tier (e.g., lesser percentage amount of color), as noted at block 220. The image data of the document is then output at block 222, and the method ends at 224.

Again, the processing and/or alteration of image data at the next highest billing tier should not be limited to a percentage amount of color. For example, in an embodiment, processing the image data of the selected next highest billing tier may comprise, either in addition to or alternative to less color coverage, one or more of the following steps: adjusting hues of colors of the image data, adjusting sharpness of pixels of the image data, adjusting contrast between pixels of the image data, adjusting saturation levels, and/or selectively processing pixels based on a type of image data for output, before the document is output.

In another embodiment, the user credentials used to determine one or more billing tiers at which a document may be output for a specific user are based on credit. For example, the predetermined threshold for each billing tier (e.g., Tier-1, Tier-2, Tier-3) may be an amount of color in the document (or page), and the credentials of the profile show that a user has a particular amount of credit for outputting documents. For purposes of this disclosure, "credit" is defined as a value that is available for using (e.g., actual funds that are available for using or spending) or for borrowing (e.g., for later repayment). In some instances, the value may be monetary. Alternatively, a value may be a number such as a number of copies or prints that can be made. A user may be authorized (or limited) by an amount of credit available for printing documents.

In the case of credit being a monetary value, for example, in an embodiment, a customer may pre-pay for a number of jobs and/or type of jobs for output, and/or have one or more credits for one or more number of or types of jobs. In an embodiment, a user may pre-pay for a number of jobs associated with one or more available billing tiers—e.g., ten credits for output at Tier-3, ten credits for output at Tier-2, and ten credits for output at Tier-1. For example, Tier-3 jobs can be output by a user until the credit is exhausted, then jobs will be printed with the lower-quality Tier-2 output. (This can be repeated until all credit for lowest-quality Tier-1 output is exhausted, if no additional credit is added to the user's credentials.)

In another embodiment, a user may have credit on his/her associated account for printing at any number of the available billing tiers. For example, a user may have a pre-credited monetary sum amount that is or will be reduced based on a billing cost for outputting a job. In another embodiment, a customer may have credit for outputting documents with a particular machine. In yet another embodiment, a user may have credit on his/her associated account for printing at any number of the available billing tiers using any available output device or machine.

As such, based on the user's credit indicated in the credentials, the billing tier and output of the document may be selected, processed, and output accordingly without user intervention. For example, a user may have credit for printing level one and level two color impressions (i.e., documents determined to be of a Tier-1 or a Tier-2 billing structure). If the user inputs a document that has level three color impressions, i.e., the processor determines the highest billing tier for the document to be Tier-3, then the processor can determine a next highest billing tier for processing and outputting the image data based on the user's credit. In this embodiment, the next highest billing tier is selected based on the billing cost and credit available (in addition to the processed image data). Thus, processing the image data may comprise altering the output document such that the amount of color coverage is less when output. Such alteration of the image data/output document may include processing the image data with the processor(s) such that an amount of output color pixels are limited, an amount of colorant (ink/toner) used for marking and outputting the document is limited, saturation levels are limited/reduced, etc. The processing and/or alteration of image data at the next highest billing tier may also comprise (in addition to or alternative to) one or more of the following steps: adjusting hues of colors of the image data, adjusting sharpness of pixels of the image data, adjusting contrast between pixels of the image data, adjusting saturation levels, and/or selectively processing pixels based on a type of image data for output. It should be understood by one of ordinary skill in the art that additional processing steps may be applied to pixels of image data of a document to be output to meet restrictions and/or constraints of the credentials and/or tiers. For example, for a document or a page with different image data types including color text logos, monochrome objects, and colored picture areas, it may be determined according to a user's profile credentials that only the logos could be printed in true color, while the rest of the document (i.e., monochrome objects and colored picture areas) is output (e.g., printed) in less saturated color or in black and white (or grayscale).

Figure 3:
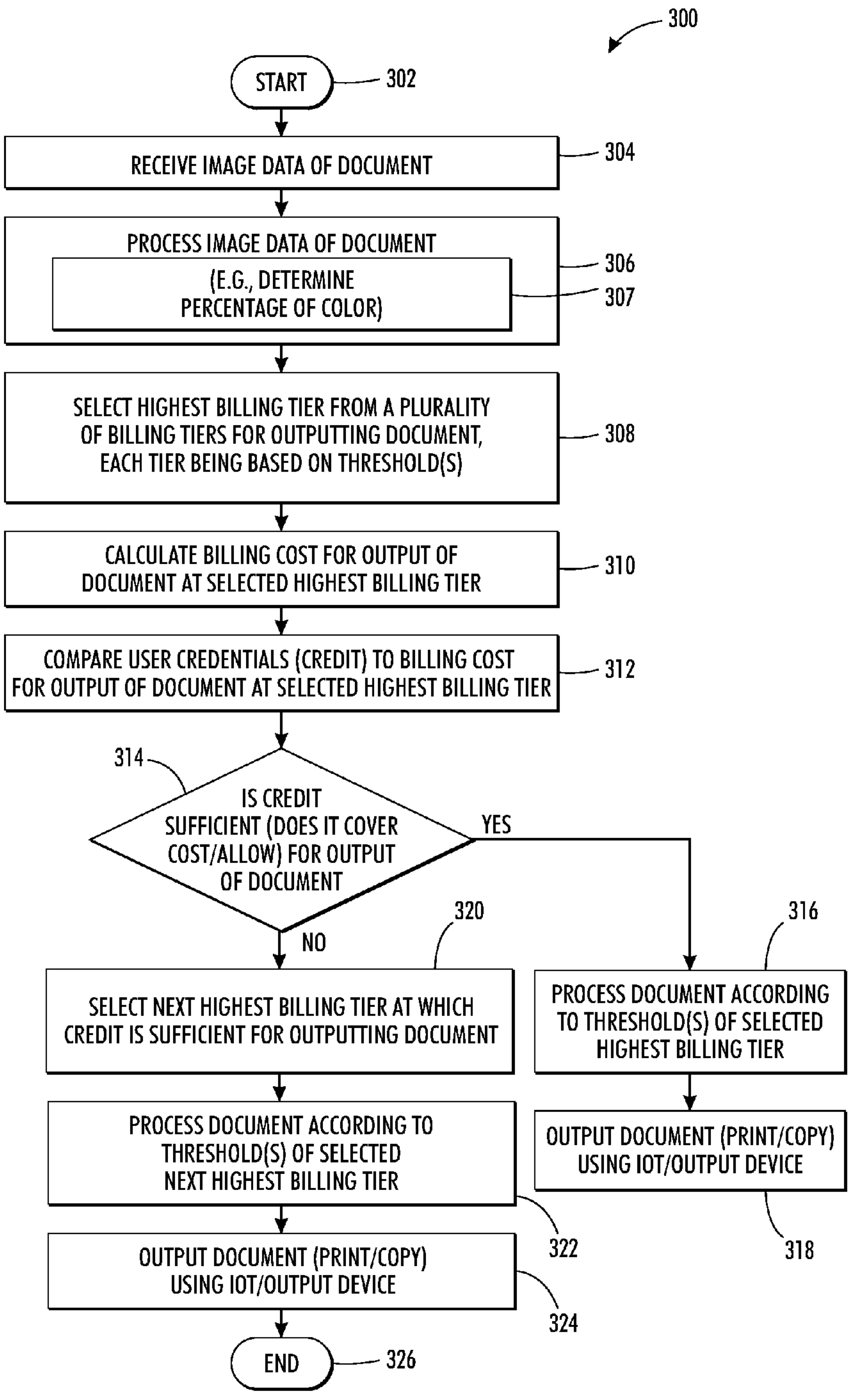
FIG. 3 illustrates an exemplary flow chart/block diagram of a method for automatically outputting documents wherein a user's credentials comprise credit for outputting documents, in accordance with an embodiment.

FIG. 3 illustrates an exemplary flow chart diagram of a method 300 for automatically outputting documents wherein the user credentials comprise credit, as described above. The method 300 of FIG. 3 begins or starts at block 302, and at block 304 image data of a document is received by the processor (or system or apparatus). Although not shown, credentials for a user may also be received, such as via input (before or after image data is received) and/or by reading data associated with the document. Then, at block 306, the image data of the document is processed for output. In this embodiment, processing the image data for output may comprise, among other things, determining a percentage amount of color in the document, as indicated at block 307. An initial highest billing tier then is selected from a plurality of billing tiers based on the processed image data at block 308. For example, in an embodiment, the initial highest billing tier may be a billing tier at which the image data is output with its highest percentage amount of color, at its highest quality (e.g., all colors and color spaces (including black/grayscale), and/or rendering techniques, are used to process the pixels of image data and then the billing tier is selected based on such processing). The billing cost for outputting the document at the initial highest billing tier (e.g., higher/highest percentage amount of color and/or highest output quality) is then calculated (e.g., using a cost calculation element) at block 310. At block 312 the user's credentials, i.e., a user's credit, is compared to the billing cost for output of the document. That is, the comparison determines if the user's credit is sufficient for outputting the processed image data at initially selected highest billing tier. For example, it may be determined if the credit covers the calculated billing cost for printing the document or if the credit allows for printing at the initially selected highest billing tier. If the user's credit covers or allows for output of the document at block 314, i.e., YES, then the image data is processed at block 316 according to at least the one predetermined threshold of the selected highest billing tier and then the document is output at block 318. The method ends at block 326.

If, however, it is determined that the initially selected highest billing tier is insufficient (based on the comparison), i.e., the user's credit does not cover the cost or allow for output at the selected highest billing tier at block 314, i.e., NO, then a next billing tier at which output of the document is sufficient is selected based on the credit of the user's credentials at block 320. After the next billing tier is selected (based on the image data and the user credit), the image data is processed according to the at least one predetermined threshold of the selected next highest billing tier (if necessary), as noted at block 322. The image data of the document is then output at block 324, and the method ends at block 326.

This disclosure provides an automatic way to provide the user with a maximum or a highest possible service based on at least their credentials. It does not delete a job if the required credentials (e.g., authorization or credit) are not met; rather, it automatically processes and outputs the data based on the credentials (and processed image data). It reduces and/or eliminates a need for user input (e.g., to pick a second selection) to print or copy page(s). This is advantageous as users like to receive a maximum service that they can possibly get for their credentials, without having to navigate and figure out additional alternatives or options for outputting documents. It also allows the credentials (e.g., user authorization level and/or user credit limit) to be a controlling factor for adjusting image quality/color of a document to fit a particular user.

The methods illustrated in FIGS. 1-3 are exemplary embodiments showing automatic processing and output of document(s) based on a user's credentials in accordance with this disclosure. However, such methods are not meant to be limiting. For example, in an embodiment, the selection of the highest billing tier (e.g., in block 106 of method 100) comprises receiving a user's selection for output of the document at a specific billing tier (i.e., the credentials are defined by selection or features chosen). That is, a user may input via an interface (on the machine or via remote connection) features for outputting one or more documents (e.g., a specific documents or all documents associated with the user). For example, a user may define the color level impressions for a document to be output. The selected color level impression may be used (alone or in combination with other features) to determine the first billing tier. Other features that a user may define for outputting a document may include a specific machine or device for outputting a document, an amount of colorant used in a document, a saturation level of color, a resolution for input and/or output of a document, brightness of hues of colors of the output image data, sharpness of pixels in the image data, contrast between pixels of the image data, selective processing of different types of image data, and/or lightness/darkness of pixels of image data, for example. Again, one or all of these features may be used to determine the first billing tier. As such, the herein disclosed method may be applied such that if the user's selection(s) are not authorized, a next billing tier is selected and the image data is processed and output according to the next billing tier.

Figure 4:
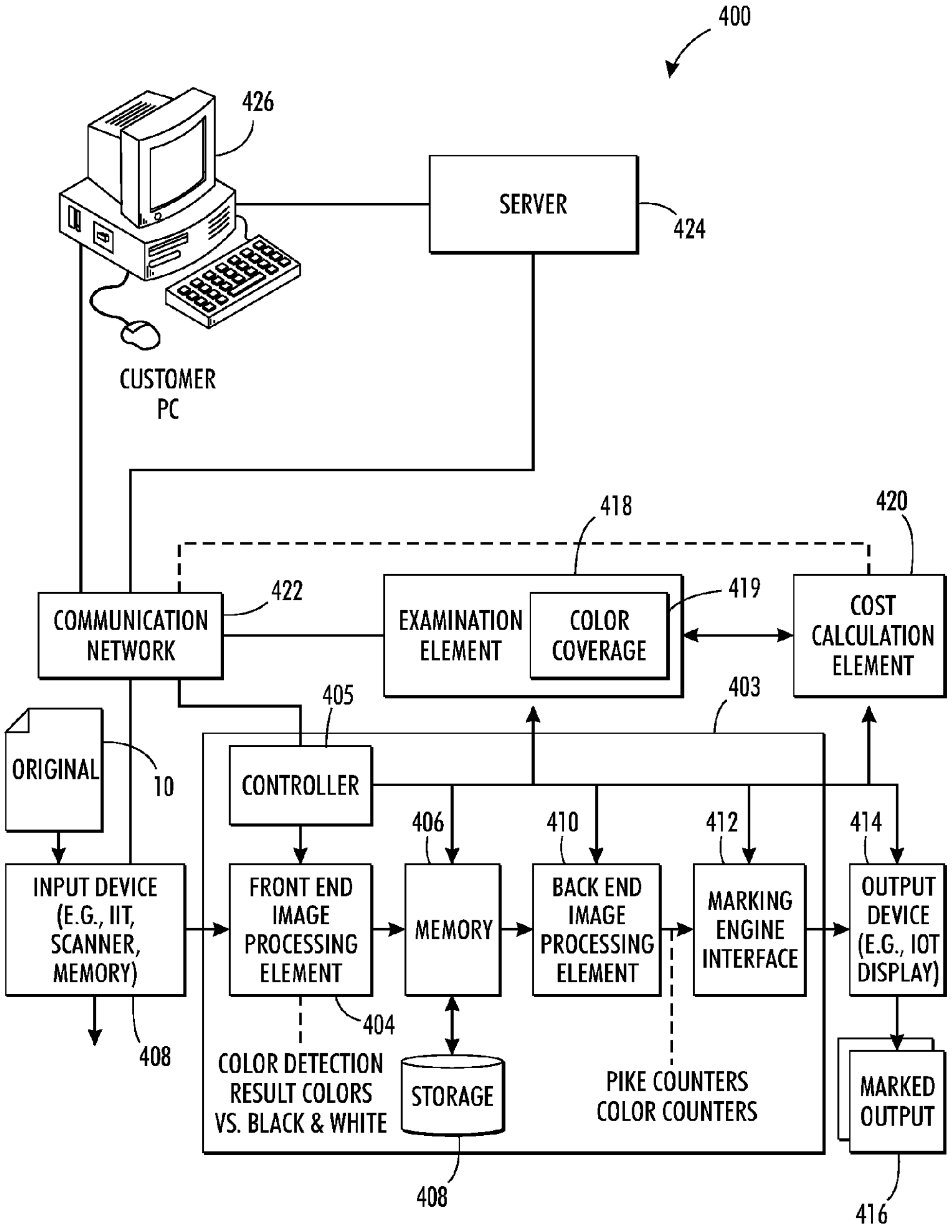
FIG. 4 illustrates an exemplary block diagram of image path of a system, device or image processing apparatus, in accordance with an embodiment, comprising at least a processor and an image output terminal, for outputting documents using the method of FIG. 1.

FIG. 4 illustrates an exemplary block diagram of image path 400 for processing image data using a system, device or image processing apparatus 403, such as an MFD. System 403 comprises at least one processor 404 for processing documents containing image data comprising a plurality of pixels and an image output terminal 414 for outputting documents according to the method 100 of FIG. 1.

More specifically, the system/device/apparatus 403 may comprise, among other devices, an input device (e.g., IIT or memory) 402, a processor or processing elements 404 and 410, a controller 405 for communicating with and controlling processor(s), a memory 406 and/or a storage device 408, and an output device (e.g., IOT) 414 and/or marking engine interface 412. The image path 400 of the system 403 may also include an examination element 418 and/or cost calculation element 420 which may be a part of the system 403 itself or in communication with the processing elements 404 and 410, for example. Generally, the above elements (as will be generally described) of the device are provided to perform functions that assist in receiving image data (such as a scanned document), configuring the image path of the processing elements 404 and 410 (and possibly elements 418 and 420) to process the image data, and automatically outputting the image data by printing (or copying) a document according to the selected highest billing tier for a user's credentials (whether it is the highest or next highest selection). However, it should be noted that the apparatus or device may comprise additional elements not described herein or alternative elements for performing similar functions, and should not be limited to those elements as illustrated in FIG. 4. Generally, the image path shown in FIG. 4 corresponds to any number of output modes that may be selected for an image processing apparatus, system, or device. The elements in the image path 800 are further described in the incorporated '686 application previously noted.

The input device 402 is used to deliver image data of a document to the system 403 and/or processing elements in the image path. In some embodiments, the input device 402 is used to scan or acquire an input document or page into image data, such as when copying a document, for example. The input device 402 may be a digital scanner, for example. The input device 402 may be a part of the system 402 or device. Generally, any device used to scan or capture the image data of a document for an image processing apparatus may be used. The input device 402 may include submission of electronic data by any means and should not be limiting. In other embodiments, the input device 402 may be an electronic device for inputting electronic image data. In some embodiments, input device 402 may be connected to a network 422 or telephone system, for example, to receive as input image data such as via a server 424 or personal computer (CPU) 426. Input documents and/or image data that is received electronically may be received via a telephone number, an e-mail address, an Internet Protocol (IP) address, a server, or other methods for sending and/or receiving electronic image data. The network 422 may be a digital network such as a local area network (LAN), a wide area network (WAN), the Internet or Internet Protocol (IP) network, broadband networks (e.g., PSTN with broadband technology), DSL, Voice Over IP, WiFi network, or other networks or systems, or a combination of networks and/or systems, for example, and should not be limited to those mentioned above. In any case, image data, such as image data for an original document 10, may be received or input to/from the input device 402.

FIG. 4 also shows a processor or processing elements for processing and/or manipulating image data using a plurality of operations and/or processes, including those of the disclosed methods. The description of the processing elements below is an example of devices capable of implementing processes to be performed and should not be limiting. For example, additional or less processing elements may be provided along the image path 400. Alternatively, additional operations may be performed on the image data other than or in addition to those described with reference to FIG. 4. A controller 405 (e.g., microcontroller) may be provided in the image path to communicate with and to control elements of the system.

The image path 400 of system 403 may comprise a plurality of image processing elements (or processor) for manipulating image data received from the input device 402 using a plurality of operations and/or processes. The processing elements may be a combination of image processing elements which comprise software and hardware elements that perform a number of operations on the image data received from the input device 402 (e.g., IIT/scanner, memory, or other source) using a set of parameters. The parameters are used to convert the images for output at the selected highest billing tier (e.g., highest color quality) along the image path. The processing elements may be a part of a computer system, device, or apparatus such as a xerographic system, a photocopier, a printing device, or a multi-function device (MFD). For simplicity purposes, the term "processing element" and "processor" throughout the application will refer to one or more elements capable of executing machine executable program instructions. It is to be understood that any number of processing elements may be used and that additional operations or processes besides those described below may be provided in an image path. Each of the image processing elements comprises an input and an output. Additionally, the system, device, or apparatus may also include one or more routers (not shown) to select and route the image data between the processing elements and other elements, for example.

More specifically, the image path of FIG. 4 comprises a front end processing element 404, a memory 406, storage 408, and a back end processing element 410. Each of the devices or elements in the image path may be in communication with each other and with controller 405, as represented by path 407. The use of processing elements such as front and back end processing elements 404 and 410 for processing image data is generally known in the art (for example, color space conversion, rendering, etc.) and therefore is not described in detail herein.

In an embodiment, the front end processing element 404 is an image processing element that receives image data in an image path and is used to process the image data to select a highest billing tier for output of the image data. The back end processing element 410 is generally used at the end of an image path to retrieve stored image data and to process the image data according to the selected highest billing tier (e.g., the highest billing tier or next highest billing tier, depending on user credentials) such that the image data may be output to a printing device as an accurate recreation of the original input or scanned image and in accordance with the highest color and quality output for the specific user, for example. Of course, processing elements may also be used for compression and/or decompression of image data.

In an embodiment, one or more of the elements (e.g., processing elements 404, 410 and memory 406/storage 408) of system 403 may be connected to network 422 or telephone system, for example, for communication with other devices, systems, or apparatuses. For example, in some cases, image data, user credentials, or executable instructions may be provided via a server 424 or a computer (CPU) 426 connected to the network 422. As further described below, in a possible embodiment, at least one processing element of system 403 may implement an operative set of processor executable instructions in accordance with the herein disclosed methods 100, 200, and/or 300.

Memory 406 and/or storage 408 may be used to store image data. For example, memory 406 and/or storage 408 may be used to temporarily store the original image data of document input via input device 402. Memory 406 and/or storage 408 may be used to store machine readable instructions to be executed by the processor/processing elements, and, in an embodiment, may store one or more user credential (s) for outputting documents. The memory 406 and/or storage 408 may be implemented using static or dynamic RAM (random access memory), a floppy disk and disk drive, a writable optical disk and disk drive, a hard disk and disk drive, flash memory, or the like, and may be distributed among separate memory components. The memory 406 and/or storage 408 can also include read only memory, or other removable storage drive(s) or memory devices.

The front end processing element 404 may communicate with memory 406 and/or storage 408 of system/apparatus 400 to store processed and/or compressed image data, for example. Compressed image data may be stored in memory 406 and/or storage 408 temporarily or for a later time when needed. When the image data is needed or it is time for marking (e.g., using the marking engine interface 412 or output device/terminal 414), the image data may be retrieved from memory 406 and/or storage 408 via the back end processing element 410 to export the image data that has been scanned, for example. In an embodiment, the image data may be retrieved and further processed (e.g., according to at least one predetermined threshold of a selected highest or next highest billing tier) for output.

In an embodiment, the image data may be processed and may be directly output to the marking engine interface 412 for printing using an output device/terminal 414 in accordance with predetermined threshold(s) of a selected highest billing tier. In another embodiment, the image data is further processed by the processor(s) in accordance with predetermined threshold(s) of a selected next highest billing tier before being output to marking engine interface 412 and output device 414. The marking engine interface 412 and/or output device 414 may be associated with a printer or MFD which is used for printing documents. In some cases, the marking engine interface may be a part of the output device 414.

In an embodiment, the marking engine interface 412 may be designed to receive reconstructed and processed image data to send or output to the output device 414 (e.g., printer) for a copy or print job. The marking engine interface 412 may further perform image processing on the image data to make corrections or compensate for deviation in the printing process. Alternatively, the back end processing element 410 may be used to perform further image processing on the image data.

The marking engine interface 412 outputs processed image data to the output device 414 for outputting the image data of the document. The type of output device 414 should not be limiting. For example, the output device 414 may comprise an image output terminal (IOT), printing device, copying device, MFD, or other devices.

It should be noted that the output print quality of image data from an output device 414 such as a MFD may depend on the type of system or device (and its available output modes/resolution). Accordingly, the billing tiers may also depend on the type of device. For example, an output device with multiple print or copy quality modes (standard, enhanced, expressive, high resolution/photo, etc.), each which may have a different resolution, are supported. Additionally, each may be a part of the user credentials and/or used to select a billing tier (a highest or a next highest one) at which a document is processed and output. Of course, these modes are just an example of modes that may be used for printing using the output device 414, and, therefore, should not be limiting.

In an embodiment, the system 403 may further comprise one or more elements for selecting a highest billing structure and/or a billing cost for outputting a page or document via an output device such as device 414. For example, as shown in FIG. 4, an examination element 418 and/or cost calculation element 420 may be provided. In an embodiment, the examination element 418 and/or cost calculation element 420 may be a part of the system 403. In an embodiment, the elements 418 and/or 420 are separate from the image path of the system 403. In an embodiment, the features, calculations, selections, and/or determinations provided by examination element 418 and/or cost calculation element 420 may be incorporated into one or more processing elements, such as elements 404, 410, or 412, and therefore such elements should not be limited to the illustrated embodiment.

Examination element 414 may be configured to examine the image data. The examination element 414 may assist in determining the amount of color coverage of a page or a document of image data (percentage amount of color). For example, the examination element 418 may comprise a color coverage element 419 that is configured to determine a color pixel count, marked color pixel locations to be output, and/or a ratio or percentage of the pixel count of the marked color pixel locations to the maximum number of pixel locations capable of being output on the page.

The examination element 418 may operatively communicate with a cost calculation element 420. The cost calculation element 420 is configured to calculate a billing cost or an approximate cost for outputting the page and/or document of image data using the determined amount of color coverage of the page (e.g., using the pixel count of the marked color pixel locations). Such is effective when a user's credentials comprise at least a credit as shown and described with regard to the embodiment of FIG. 3. The billing cost may be calculated any number of times and based on processed image data of a selected highest and/or selected next highest billing structure. For example, if it is determined that a page is to be billed using a Tier-2 of a multi-tiered billing structure, the cost associated with Tier-2 may be employed (and compared, if applicable).

As previously mentioned, in an embodiment, the billing structure may consider the type of output device to be used when any of the disclosed methods are implemented. Additionally, the billing cost may be further calculated based on a type of output device to be used. For example, when printing to a printer or MFD, the chosen type of output device may alter the cost for printing the page or document due to the plurality of output modes, tiers, inks, toners, and other elements which contribute to the quality of the output document 416. The billing cost may be calculated with or separately from the billing structure selection. In an embodiment, the cost calculation element 420 is configured to operatively communicate with the examination device 418 and at least one of the processing elements (such as 410 or 412) to calculate a billing cost for outputting the page and/or document.

In a possible embodiment, examination element 418 and cost calculation element 420 are part of a billing system to be implemented by an operative set of processor executable instructions configured for execution by at least one processor or processing element. The billing system may be provided at a remote location with respect to the at least one processor. In an embodiment, the at least one processor is provided in an image processing apparatus or system. In an embodiment, the at least one processor of the billing system is provided at a remote location with respect to an output device. As noted above, at least one processing element of system 403 may implement the operative set of processor executable instructions of the billing system by communicating via the network 422, for example. The at least one processing element may thus be provided in the same or a remote location with respect to the output device. In some cases, the examination element 418 and/or cost calculation element 420 may communicate an approximate cost or billing cost to the processor/system 403. In some cases, the examination element 418 and/or cost calculation element 420 may be a part of the processor which communicates with system 403 or an output device.

Also, it is envisioned that an embodiment in accordance with this disclosure may include a system that utilizes a network connection 422 for proposed billing determinations or selections, and/or for receiving user credentials and documents. The network may include any type of network such as the Internet, Wi-Fi, DSL, local area network (LAN), or wide area network (WAN), for example. In an embodiment, a customer may input and view (via a display device) information on CPU 426 that is connected to network 422, either by communicating directly with system 403 or by instructing system 403 to retrieved information (document(s) or profile credentials) from a server 424 (also connected network 422). Once a customer submits a job (e.g., document) and his profile/credentials to a website, for example, the job is processed and output using an image output terminal/device utilizing the disclosed method(s) such as method 100.

In some cases, a user interface (UI) may be provided directly on the output apparatus/device and/or CPU 426, while in others a UI is provided as a separate electronic device. Besides for inputting or providing image data and/or user credentials, the UI may also display a user's credentials. For example, a user may view authorized billing tier(s) and/or a credit. A user may also view features associated with outputting jobs (e.g., tier at which a job was output, cost for outputting a job) via the UI.

As such, the herein disclosed methods and system offer a number of improvements over prior methods for processing and outputting image data. In particular, the methods provide an automatic approach to render input document(s) to a maximum billing tier, (as determined by the controller and/or processor(s)). They also provide users with improved productivity by enabling printing/copying at the best image quality level (e.g., color output) without requiring much user input.

It also provides a greater control over color usage. For example, in one way it offers users/customers an ability to provide color usage limits through a tiered billing plan. For example, features for outputting documents may be authorized/restricted according to each individual user (e.g., seniority) or according to user credit. In an environment wherein credit may be added to a user's credentials (e.g., before printing or copying documents), the disclosed method provides some flexibility for outputting documents. For example, the user may decide what amount they are willing to pay for printing documents, e.g., by crediting specific tiers of their credentials, which will be automatically translated to an appropriate Tier level.

Moreover, in a credit-based environment for example, a supplier may offer customer-based incentives based on user profiles. That is, user profiles and credentials may be adjusted according to a supplier-customer relationship. For example, profiles of premium customers automatically get the maximum tier without any restriction; other customers can be appropriately categorized to the different Tiers that are available in the device. Also, customer incentives such as special promotions (upgrade in Tier level) could be provided to customers.

In another way, color usage may be centrally controlled by a system administrator or department, such as in an office environment. For example, a system administrator may determine the one or more authorized tiers associated with each user's credentials. Such information may be accessed, edited, and saved in a server such as server 424, for example. In an embodiment, the administrator or department may limit color printing (i.e., tiers) using a timing system. For example, the billing tiers may be defined by a time of day. Alternatively, the system administrator or department may be used to turn on or turn off the automatic features as provided by the methods 100, 200, and 300. Such features need not be implemented based on individual sites, specific output devices or machines, and/or a customer environment, for example.

According to an embodiment of the disclosure, the processing and output of image data is provided in response to the processing elements of system 803 executing one or more sequences of one or more instructions contained in a memory (e.g., memory 806). Such instructions may be read into the memory from another computer-readable medium, such as a storage device (which may or may not be a part of the memory). Execution of the sequences of instructions contained in the memory causes processing elements to perform the process steps of method 100, 200, and/or 300 as described herein. One or more processors in a multi-processing arrangement may also be employed to execute the sequences of instructions contained in the memory of the system 403. However, the embodiments of this disclosure are not limited to any specific combination of hardware and/or software.

The term "computer program product" as used herein refers to any product or medium that participates in providing instructions to processor(s) for execution. Such a product may take many forms, including but not limited to, non-volatile media, volatile media, and transmission media. Common forms of computer program products or readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other product from which a computer can read. Also, various forms of computer products or media may be involved in carrying one or more sequences of one or more instructions to processor(s) for execution, and should not be limiting.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A method for automatically outputting documents comprising at least one page for a specified user using an image processing apparatus, the image processing apparatus comprising a processor for processing documents containing image data comprising a plurality of pixels and an image output terminal for outputting documents, the processor configured to perform the method comprising:

receiving image data of a document comprising at least one page;

selecting a highest available billing tier for processing the image data from three or more billing tiers, each billing tier being based on at least one predetermined threshold value relating to an amount of output color in the document;

comparing credentials for the specified user to the selected highest available billing tier for processing the image data to determine if output at the selected highest available billing tier is authorized, the credentials comprising at least authorization for outputting documents at one or more predetermined billing tiers from the three or more billing tiers, the authorization comprising at least a specified user's right to color printing privileges; and, if the comparison results in the image data being authorized for output at the selected highest available billing tier, then:

(i) processing the image data according to the at least one predetermined threshold value of the selected highest available billing tier, and (ii) outputting the processed image data of the document using the image output terminal;

else, if the comparison results in the image data being unauthorized for output at the selected highest available billing tier, then:

(i) selecting a next highest available billing tier from the three or more billing tiers for processing the image data that is authorized for output based on the credentials, the next highest available billing tier comprising processing the image data with a lesser amount of color than an amount of color if processed at the selected highest available billing tier, (ii) processing the image data according to the at least one predetermined threshold value of the selected next highest available billing tier, and (iii) outputting the processed image data of the document using the image output terminal, wherein the selecting, processing, and outputting at either the selected highest available billing tier or the selected next highest available billing tier is automatically performed by the processor without user interaction or input.

2. The method according to claim 1, wherein the credentials further comprise credit for outputting documents, wherein the selecting the highest available billing tier of the method further comprises:

calculating a billing cost using a cost calculation element for output of the processed image data based on the selected highest available billing tier, and comparing the credit to the calculated billing cost at the selected highest available billing tier to determine if output is authorized.

3. The method according to claim 2, wherein if the comparison results in insufficient credit for output of the image data at the selected highest available billing tier, then the method further comprises:

selecting a next highest available billing tier from the three or more billing tiers for processing the image data that is sufficient for output, where an availability of a next highest available billing tier is based on the credit available;

processing the image data according to the at least one predetermined threshold value of the selected next highest available billing tier, and outputting the processed image data of the document using the image output terminal, wherein the selecting, processing, and outputting is performed without user interaction or input.

4. The method according to claim 1, wherein the processing of the image data of the selected next highest available billing tier with the lesser amount of color further comprises one or more of the following steps: adjusting hues of colors of the image data, adjusting sharpness of pixels of the image data, adjusting contrast between pixels of the image data, and selectively processing pixels based on a type of image data for output.

5. The method according to claim 1, wherein the at least one predetermined threshold value relating to an amount of output color for each billing tier is selected from one or more of the following group: a percentage amount of color in the document, an amount of colorant used to output the document, and a saturation level of color.

6. The method according to claim 1, wherein the selection of the highest available billing tier comprises receiving a user's selection for output of the document at a specific billing tier that is input before the image data is received.

7. A system for automatically outputting documents comprising at least one page for a specified user, the system comprising:

a processor for processing documents containing image data comprising a plurality of pixels; and an image output terminal for outputting documents, wherein the processor is configured to:

receive image data of a document comprising at least one page;

select a highest available billing tier for processing the image data from three or more billing tiers, each billing tier being based on at least one predetermined threshold value relating to an amount of output color in the document;

compare credentials for the specified user to the selected highest available billing tier for processing the image data to determine if output at the selected highest available billing tier is authorized, the credentials comprising at least authorization for outputting documents at one or more predetermined billing tiers from the three or more billing tiers, the authorization comprising at least a specified user's right to color printing privileges; and, if the comparison results in the image data being authorized for output at the selected highest available billing tier, then the processor being configured to:

(i) process the image data according to the at least one predetermined threshold value of the selected highest available billing tier, and (ii) output the processed image data of the document using the image output terminal;

else, if the comparison results in the image data being unauthorized for output at the selected highest available billing tier, then the processor being configured to:

(i) select a next highest available billing tier from the three or more billing tiers for processing the image data that is authorized for output based on the credentials, the next highest available billing tier comprising processing the image data with a lesser amount of color than an amount of color if processed at the selected highest available billing tier, (ii) process the image data according to the at least one predetermined threshold value of the selected next highest available billing tier, and (iii) output the processed image data of the document using the image output terminal, wherein the selection, processing, and output at either the selected highest available billing tier or the selected next highest available billing tier is automatically performed by the processor without user interaction or input.

8. The system according to claim 7, wherein the system further comprises an image input terminal for inputting documents, a memory device, and a storage device, and wherein the image data of the document is received from one of the group consisting of: the image input terminal, the memory device, or the storage device.

9. The system according to claim 7, wherein the credentials further comprise credit for outputting documents, wherein the system further comprises a cost calculation element configured to calculate the billing cost for output of the processed image data based on the selected highest available billing tier, and wherein the processor is further configured to compare the credit to the calculated billing cost at the selected highest available billing tier to determine if output is authorized.

10. The system according to claim 9, wherein if the comparison results in insufficient credit for output of the image data the selected highest available billing tier, then the processor is further configured to:

select a next highest available billing tier from the three or more billing tiers for processing the image data that is sufficient for output, where an availability of a next highest available billing tier is based on the credit available;

process the image data according to the at least one predetermined threshold value of the selected next highest available billing tier, and output the processed image data of the document using the image output terminal, wherein the selection, processing, and output is performed without user interaction or input.

11. The method according to claim 7, wherein the processing of the image data of the selected next highest available billing tier with the lesser amount of color further comprises one or more of the following steps: adjusting hues of colors of the image data, adjusting sharpness of pixels of the image data, adjusting contrast between pixels of the image data, and selectively processing pixels based on a type of image data for output.

12. The system according to claim 7, wherein the at least one predetermined threshold value relating to an amount of output color for each billing tier is selected from one or more of the following group: a percentage amount of color in the document, an amount of colorant used to output the document, and a saturation level of color.

13. The system according to claim 7, wherein the selection of the highest available billing tier is based on a user's selection for output of the document at a specific billing tier that is input before the image data is received.

14. The method according to claim 1, wherein at least two of the three or more billing tiers comprise respective, different amounts of output color for outputting documents.

15. The system according to claim 7, wherein at least two of the three or more billing tiers comprise respective, different amounts of output color for outputting documents.

* * * * *